Feb. 22, 1966   T. G. VAN DOLAH   3,236,216
ANTI-SMOG DEVICE
Filed Aug. 5, 1964

INVENTOR
Theodore G. Van Dolah

United States Patent Office 3,236,216
Patented Feb. 22, 1966

3,236,216
ANTI-SMOG DEVICE
Theodore G. Van Dolah, 3343 N. Stallo,
South San Gabriel, Calif.
Filed Aug. 5, 1964, Ser. No. 387,627
4 Claims. (Cl. 123—119)

This invention relates to a device that prevents smog when secured to an internal combustion engine.

Most, if not all, anti-smog devices so far offered the public, or even noted in the newspapers, periodicals and automotive trade journals are devices which are attached to the muffler of an automotive vehicle, or else they replace the muffler altogether.

The average person working on an anti-smog device completely overlooks the fact that much of the smog is caused by the hot oil fumes escaping from the crankcase breather tube or its equivalent.

It is therefore the principal object of this invention to provide an anti-smog device that liquifies and cleans the vapors coming from the crankcase of an internal combustion engine, by reason of a built-in condenser, and other novel structures described in detail in this specification and set forth in the appended claims. Another object of this invention is to provide an anti-smog device that takes up a minimum of space when secured in place on an internal combustion engine, or connected to one when placed under the hood of an automobile or the like.

Another object of this invention is to provide an anti-smog device that does not contain any moving parts.

Another object of this invention is to provide an anti-smog device that can readily be taken apart and cleaned from time to time.

Still another object of this invention is to provide an anti-smog device that can be manufactured in any desired size for use on any internal combustion engine, regardless of how the engine may be used.

Other objects and advantages of the invention, relating to the particular arrangement and construction of the various parts, will become apparent as the description proceeds.

Figure 1:
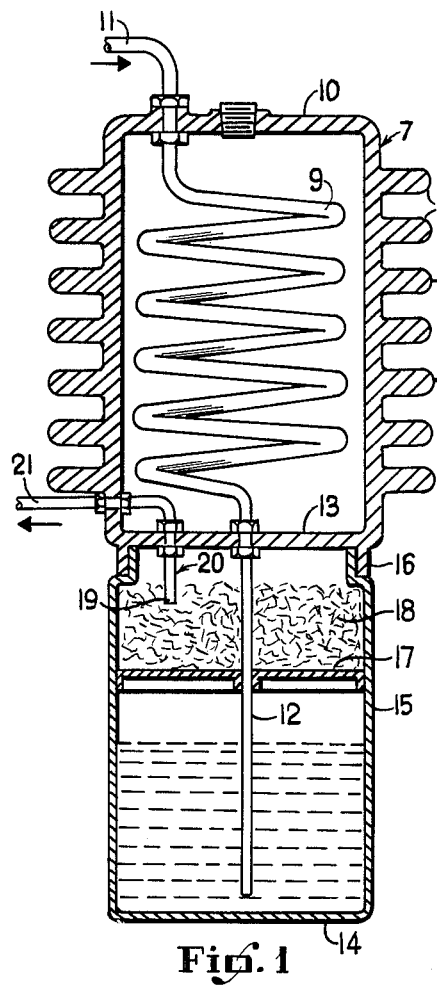
Figure 2:
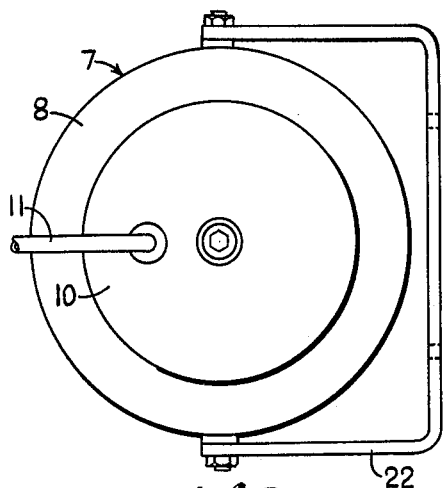
Figure 3:
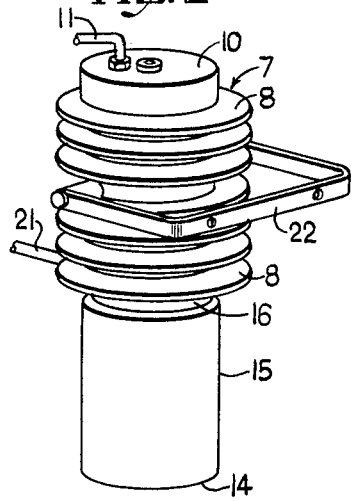
Figure 4:
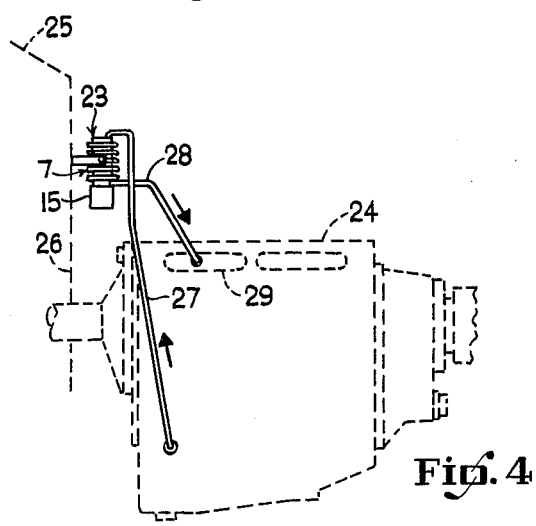

Referring to the drawing:
FIGURE 1 is a vertical sectional view of this invention.
FIGURE 2 is a top view of this invention.
FIGURE 3 is a pictorial view of this invention.
FIGURE 4 is a side view of this invention installed under the hood of an automobile and connected to its engine which is shown in phantom lines.

Referring now to FIGURE 1 by reference characters, there is shown a cylindrical container 7 having a plurality or equally spaced and parallel cooling fins 8 integral therewith and encircling the aforesaid container, in which is located the condenser tubing 9 which is coiled in the usual manner and which is preferably made of copper. The uppermost end of the aforesaid condenser tubing 9 passes through the flat top 10 of the cylindrical container 7 and terminates in the horizontally disposed inlet tube 11 while the lowermost end of the same condenser tube 9 terminates in a vertically disposed tube 12 that extends downward through the center of the flat bottom 13 of the aforesaid cylindrical container 7 and stops just short of the flat bottom 13 of the aforesaid cylindrical container 7 and stops just short of the flat bottom 14 of the accumulator jar 15 that has its upper end suitably secured to the inside periphery of the flange 16 that is integral with the often mentioned cylindrical container 7.

Continuing to examine FIGURE 1 of the drawing one will see that the aforesaid accumulator jar 15 is provided with a plate 17 that contains a plurality of openings therein. The plate 17 supports the wire mesh baffle 18 in one of which downwardly projects the vertical end 19 of the outlet tube 20 that has its horizontal end 21 projecting outwardly through the lower end of the cylindrical container 7. The vertical portion of this same tube is seen to be supported by and extending through the aforesaid flat bottom 13 of the same cylindrical container 7. This complete anti-smog device that I have invented and just described in detail is secured to any desired support by means of the U-shaped bracket 22. The entire invention is indicated in FIGURE 4 of the drawing by the reference character 23 where it is shown to be connected to the internal combustion engine 24 of the automobile 25 that has a fire-wall 26 to which the U-shaped bracket 22 of this invention is secured thereby firmly supporting the invention above and to one side of the internal combustion engine 24. An inlet pipe 27 connects the aforesaid inlet tube 11 of this invention to the crankcase of the engine while the outlet tube 28 connects the outlet tube 20 of the invention to the intake manifold 29 of the engine. The intake has suction which will draw the gases from the crankcase, through the condenser. The exhaust manifold has pressure which may be higher than the pressure in the crankcase.

When the internal combustion engine 24 is running, the hot vapors from the crankcase are sucked up into the anti-smog device that has just herein been described in detail by vacuum, where the vapors pass downward through the condenser tubing 9 into the accumulator jar 15 where they have by that time been condensed into a liquid which is held by the accumulator jar 15. The remaining vapors which cannot be liquified are now sucked up through the aforesaid plate 17 which as has been said, contains a plurality of openings. The vapors continue to be sucked up through the wire mesh baffle 18 and on out through the outlet tubes 20 and 28 on into the exhaust manifold 29 of the internal combustion engine 24 where they pass through the engine into the exhaust manifold and the purified vapors, are harmlessly discharged into the air with out any harmful effects to man or animal.

Although a particular preferred embodiment of the invention has been disclosed above in detail for illustrative purposes, it will be understood that variations or modifications of such disclosure, which lie within the scope of the appended claims are fully contemplated.

What is claimed is:
1. An anti-smog device of the character described, comprising a cylindrical container in which is located a condenser tube which has one end connected to the crank case of an internal combustion engine, and the other end terminating in an accumulator jar secured to the lower end of the said cylindrical container, and material located in the said accumulator jar which assists in condensing the vapors coming out of the said condenser tube from the said internal combustion engine, and an outlet tube having one end projecting downwardly in the said accumulator jar and the other end extending out through the side of the said cylindrical container and connected to a tube that has its other end terminating in the intake manifold of the said internal combustion engine.

2. An anti-smog device of the character described, comprising a cylindrical container having a plurality of equally spaced and parallel cooling fins integral with the said container in which is located a condenser tube which has one end connected to the crank case of an internal combustion engine, and the other end terminating in an accumulator jar secured to the lower end of the said cylindrical container, and material located in the said accumulator jar which assists in condensing the vapors coming out of the said condenser tube from the said internal combustion engine, and an outlet tube having one end projecting downwardly in the said accumulator jar and the other end extending out through the side of the said cylindrical container and connected to a tube that has its other end terminating in the intake manifold of the said internal combustion engine.

3. An anti-smog device of the character described, comprising a cylindrical container having a plurality of equally spaced and parallel cooling fins integral with the said container in which is located a condenser tube which has one end projecting upward out of the top of the said cylindrical container and is connected to the crank case of an internal combustion engine, and the other end terminating in an accumulator jar secured to the lower end of the said cylindrical container, and material located in the said accumulator jar which assists in condensing the vapors coming out of the said condenser tube from the said internal combustion engine, and an outlet tube having one end projecting downwardly in the said accumulator jar and the other end extending out through the side of the said cylindrical container and connected to a tube that has its other end terminating in the intake manifold of the said internal combustion engine.

4. An anti-smog device of the character described, comprising a cylindrical container having a plurality of equally spaced and parallel cooling fins integral with the said container in which is located a condenser tube which has one end projecting upward out of the top of the said cylindrical container and is connected to the crank case of an internal combustion engine, and the other end terminating in an accumulator jar secured to the lower end of the said cylindrical container, and a wire mesh baffle located in the said accumulator jar which assists in condensing the vapors coming out of the said condenser tube from the said internal combustion engine, and an outlet tube having one end projecting downwardly in the said accumulator jar and the other end extending out through the side of the said cylindrical container and connected to a tube that has its other end terminating in the intake manifold of the said internal combustion engine.

References Cited by the Examiner

UNITED STATES PATENTS

| 1,889,137 | 11/1932 | White | 123—119 |
| 1,960,982 | 5/1934 | Stover | 123—119 |
| 1,990,657 | 2/1935 | Krieck | 123—119 |

KARL J. ALBRECHT, *Primary Examiner.*